(12) United States Patent
Lee

(10) Patent No.: US 12,546,109 B2
(45) Date of Patent: Feb. 10, 2026

(54) SUPPORT STRUCTURE FOR INSTALLING CEILING PLATE

(71) Applicant: Bang Woo Lee, Cheongju-si (KR)

(72) Inventor: Bang Woo Lee, Cheongju-si (KR)

( * ) Notice: Subject to any disclaimer, the term of this patent is extended or adjusted under 35 U.S.C. 154(b) by 0 days.

(21) Appl. No.: 18/688,940

(22) PCT Filed: Jan. 17, 2023

(86) PCT No.: PCT/KR2023/000776
§ 371 (c)(1),
(2) Date: Mar. 4, 2024

(87) PCT Pub. No.: WO2024/038982
PCT Pub. Date: Feb. 22, 2024

(65) Prior Publication Data
US 2025/0243664 A1     Jul. 31, 2025

(30) Foreign Application Priority Data

Aug. 18, 2022   (KR) .......................... 10-2022-0103647

(51) Int. Cl.
*E04B 9/22*         (2006.01)
*E04B 9/04*         (2006.01)

(52) U.S. Cl.
CPC ................ *E04B 9/225* (2013.01); *E04B 9/04* (2013.01)

(58) Field of Classification Search
CPC . E04B 9/225; E04B 9/04; E04B 9/242; E04B 9/20; E04B 9/18; F16B 2/10; F16B 5/065; F16B 7/22; F16B 2200/205; F16B 35/06
See application file for complete search history.

(56) References Cited

U.S. PATENT DOCUMENTS

| 2,698,071 | A | * | 12/1954 | Lee | .......................... | E04B 9/003 |
| | | | | | | 49/193 |
| 3,402,517 | A | * | 9/1968 | Halfaker | ................... | E04B 9/20 |
| | | | | | | 52/126.5 |
| 6,367,757 | B1 | * | 4/2002 | Aramaki | ................. | F21V 21/38 |
| | | | | | | 248/327 |
| 2022/0064949 | A1 | * | 3/2022 | McGee | ..................... | E04B 9/04 |

FOREIGN PATENT DOCUMENTS

JP             10102669 A  *  4/1998

* cited by examiner

*Primary Examiner* — Patrick J Maestri
(74) *Attorney, Agent, or Firm* — Studebaker Brackett PLLC

(57) ABSTRACT

An object of the present invention is to provide a support structure for installing a ceiling plate, and a configuration of the present invention includes a hanging member 110 that is fixed under a slab of a ceiling; a ceiling plate support bar 120 that is provided with a pair of mounting parts on both sides of a center and a channel 122 provided at a lower portion; and a hammer bolt 130 that is fastened to the ceiling plate support bar 120.

2 Claims, 15 Drawing Sheets

SUPPORT STRUCTURE FOR INSTALLING CEILING PLATE

CROSS-REFERENCE TO RELATED APPLICATIONS

This patent application is a U.S. national stage application of International Application No. PCT/KR2023/000776, filed Jan. 17, 2023, and the entire contents of which are incorporated herein by reference, which claims priority to Korean Patent Application No. 10-2022-0103647, filed Aug. 18, 2022, and the entire contents of which are incorporated herein by reference.

TECHNICAL FIELD

The present invention relates to a support structure for installing a ceiling plate, and more particularly, to a support structure for installing a ceiling plate with a new configuration that can provide support bars with a standardized shape at a portion where the support bars intersect horizontally and vertically, and improve a process of allowing the support bars to intersect vertically and horizontally without breaking to cut the support bars.

BACKGROUND ART

In general, piping, ducts, electrical wiring, etc., are installed at a lower portion of a slab so that they are branched. A ceiling panel is installed as a way to prevent the piping, ducts, electrical wiring, etc., from being exposed to the outside and at the same time to make the aesthetic look beautiful. That is, a plurality of ceiling panels are installed under a ceiling slab to close the lower portion of the ceiling slab of the building, and items necessary for the building, such as lighting, are installed on the ceiling panel.

In this case, a support structure for a ceiling plate 2 capable of stably mounting a plurality of ceiling panels under the ceiling slab is required.

DISCLOSURE

Technical Problem

The present invention provides a support structure for installing a ceiling plate with a new configuration that can provide support bars with a standardized shape at a portion where the support bars intersect horizontally and vertically, and improve a process of allowing the support bars to intersect vertically and horizontally without breaking to cut the support bars.

Technical Solution

According to the present invention, there is provided a support structure for installing a ceiling plate, including: a hanging member 110 that is fixed under a ceiling slab; a ceiling plate support bar 120 that is provided with a pair of mounting parts on both sides of a center and a channel 122 provided at a lower portion; and a hammer bolt 130 that is fastened to the ceiling plate support bar 120.

The channel 122 for coupling the hammer bolt 130 includes a pair of horizontal mounting pieces 122A that are provided on both sides of the lower portion of the ceiling plate support bar 120, a pair of left and right upright channel pieces 122B whose upper end portions are connected to the pair of horizontal mounting pieces 122A, and a pair of bolt coupling support pieces 122C that is connected to the pair of upright channel pieces 122B and extends horizontally in a direction approaching each other, a bolt coupling slit 122D is secured between inner ends of the pair of bolt coupling support pieces 122C facing each other, and a bolt head coupling space 122E is secured between the pair of bolt coupling support piece 122C and the pair of left and right upright channel pieces 122B.

The head 132 of the hammer bolt 130 includes a first horizontal surface portion 132A and a second horizontal surface portion 132B facing each other, and a first cross-surface portion 132C and a second cross-surface portion 132D that extend in a direction intersecting the first and second horizontal portions 132A and 132B, but are inclined at a certain angle with respect to the first and second horizontal portions 132A and 132B.

The ceiling plate support bar 120 further includes a mounting grip piece 140 that is disposed above the channel 122 and coupled via a hinge, and a grip actuating elastic body 150 that supports the mounting grip piece 140 to rotate downward toward the horizontal mounting piece 122A of the channel 122.

The hinge coupling the mounting grip piece 140 to the ceiling plate support bar 120 includes a hinge boss that is provided on the ceiling plate support bar 120 and a hinge pin that is coupled to the mounting grip piece 140 and rotatably coupled to the hinge boss, the grip actuating elastic body 150 is composed of a torsion spring in which a first elastic wire part 153 and a second elastic wire part 154 are connected to a circular elastic coil part 152, the circular coil elastic part is coupled to an outer circumferential surface of the hinge pin, and the first elastic wire part 153 and the second elastic wire part 154 are connected to the ceiling plate support bar 120 and the mounting grip piece 140, respectively.

A proximal end of the mounting grip piece 140 is provided with an upwardly inclined protrusion 156, a rotation guide bar 160 is coupled to the ceiling plate support bar 120 in a screw manner so that the rotation guide bar 160 may rotate and move up and down, an extended body 163 is provided at a lower end portion of the rotation guide bar 160, and a downwardly inclined guide taper part 163TP is provided at an upper end portion of the extended body 163.

A reinforced coupling groove 134 is provided in the first cross-surface portion 132C and the second cross-surface portion 132D of the head 132 of the hammer bolt 130, a bolt coupling boss 124 is provided on an outer surface of the pair of upright channel pieces 122B of the channel 122 of the ceiling plate support bar 120, a fixed support bolt 125 is coupled to the bolt coupling boss 124, and a tip of the fixed support bolt 125 is inserted into the reinforced coupling groove 134 formed in the first cross-surface portion 132C and the second cross-surface portion 132D of the head 132 of the hammer bolt 130.

The support structure for installing a ceiling plate further includes a cap coupling protrusion 124PP that is provided on an outer circumferential surface of the bolt coupling boss 124, a coupling reinforcement cap 126 that is coupled to the outer circumferential surface of the bolt coupling boss 124, a coupling reinforcement locking piece 126PP that is provided on an inner circumferential surface of the coupling reinforcement cap 126, and a plurality of coupling reinforcement cap pieces 126ECP that are arranged in a radial direction with respect to a center of the coupling reinforcement cap 126 by a plurality of cutouts 126CP penetrating through the inner and outer circumferential surfaces and a tip of the coupling reinforcement cap 126.

Advantageous Effects

According to the present invention, a support bar fastening structure for constructing a ceiling panel may give support bars with a standardized appearance at a portion where support bars crosses vertically and horizontally, and allow the support bars to intersect vertically and horizontally without breaking to improve a process of cutting the support bars, so it is possible to increase process efficiency and easily and conveniently mount a ceiling plate 2 in a quadrangular space formed by the support bars that pass through cut grooves vertically and horizontally.

In addition, according to the present invention, it is possible to securely provide the support structure for the ceiling plate 2 that can be installed stably by mounting a plurality of ceiling panels under a ceiling slab.

BEST MODE

Hereinafter, preferable embodiments of the present invention will be described in detail with reference to the accompanying drawings. Objects, features, and advantages of the present invention may be more readily understood by referring to the accompanying drawings and the following detailed description. Further, in describing exemplary embodiments of the present invention, well-known functions or constructions will not be described in detail since they may unnecessarily obscure the understanding of the present invention.

In addition, terms first, second, A, B, (a), (b), and the like, will be used in describing components of the present invention. These terms are used only in order to distinguish any component from other components, and features, sequences, or the like, of corresponding components are not limited by these terms. When it is mentioned that any component is "connected" or "coupled" to another component, it is to be understood that any component is directly connected or coupled to another component or is connected or coupled to another component with the other component interposed therebetween.

In addition, the following specific structural or functional descriptions are only exemplified for the purpose of explaining the embodiments according to the concept of the present invention, and the embodiments according to the concept of the present invention may be implemented in various forms and should not be construed as limited to the embodiments described herein or in the application.

Figure 1:
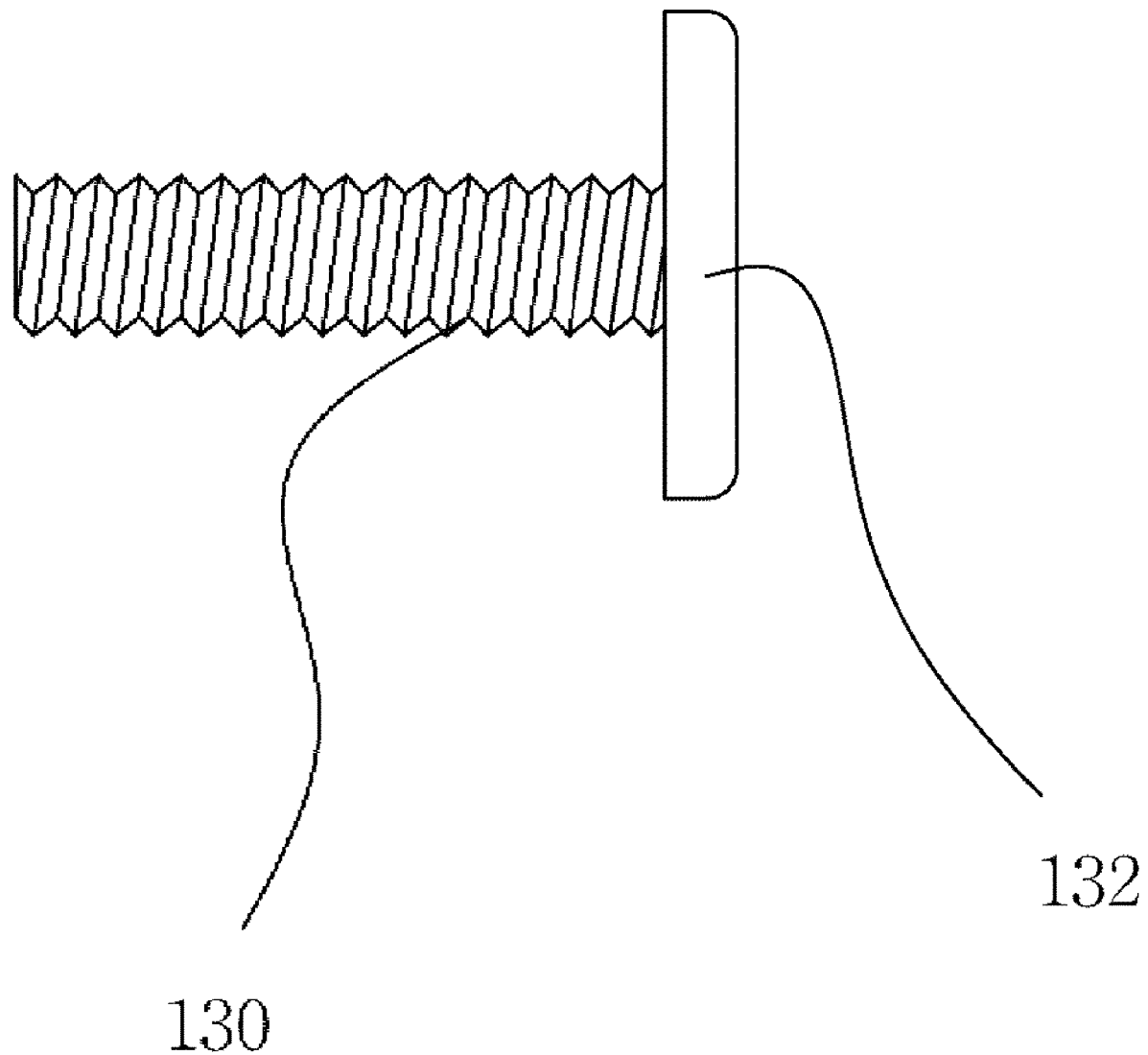
FIG. 1 is one side view of a hammer bolt which is a main part of a support structure for installing a ceiling plate according to the present invention.
Figure 2:
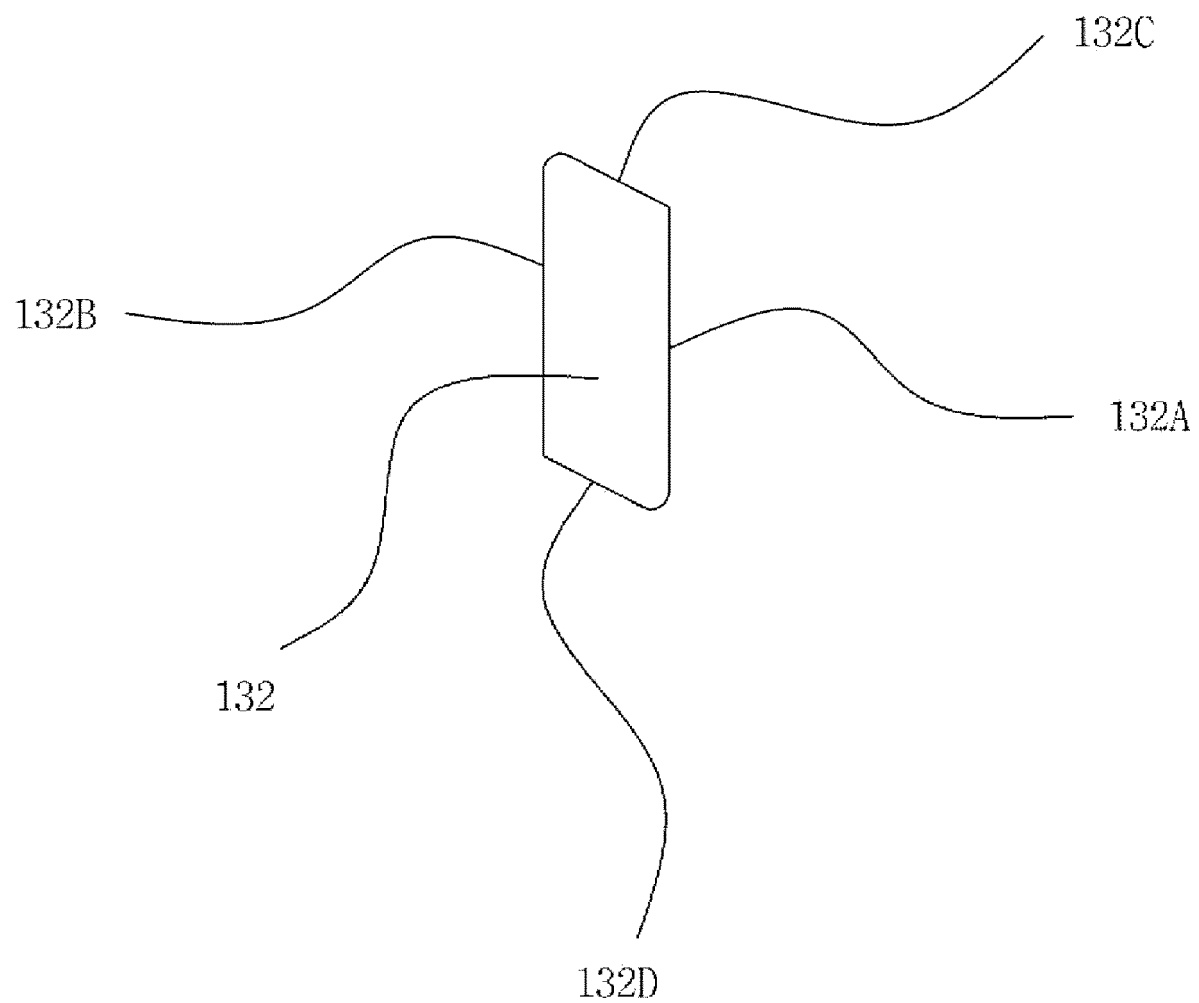
FIG. 2 is a plan view illustrating a head of a hammer bolt illustrated in FIG. 1.
Figure 3:
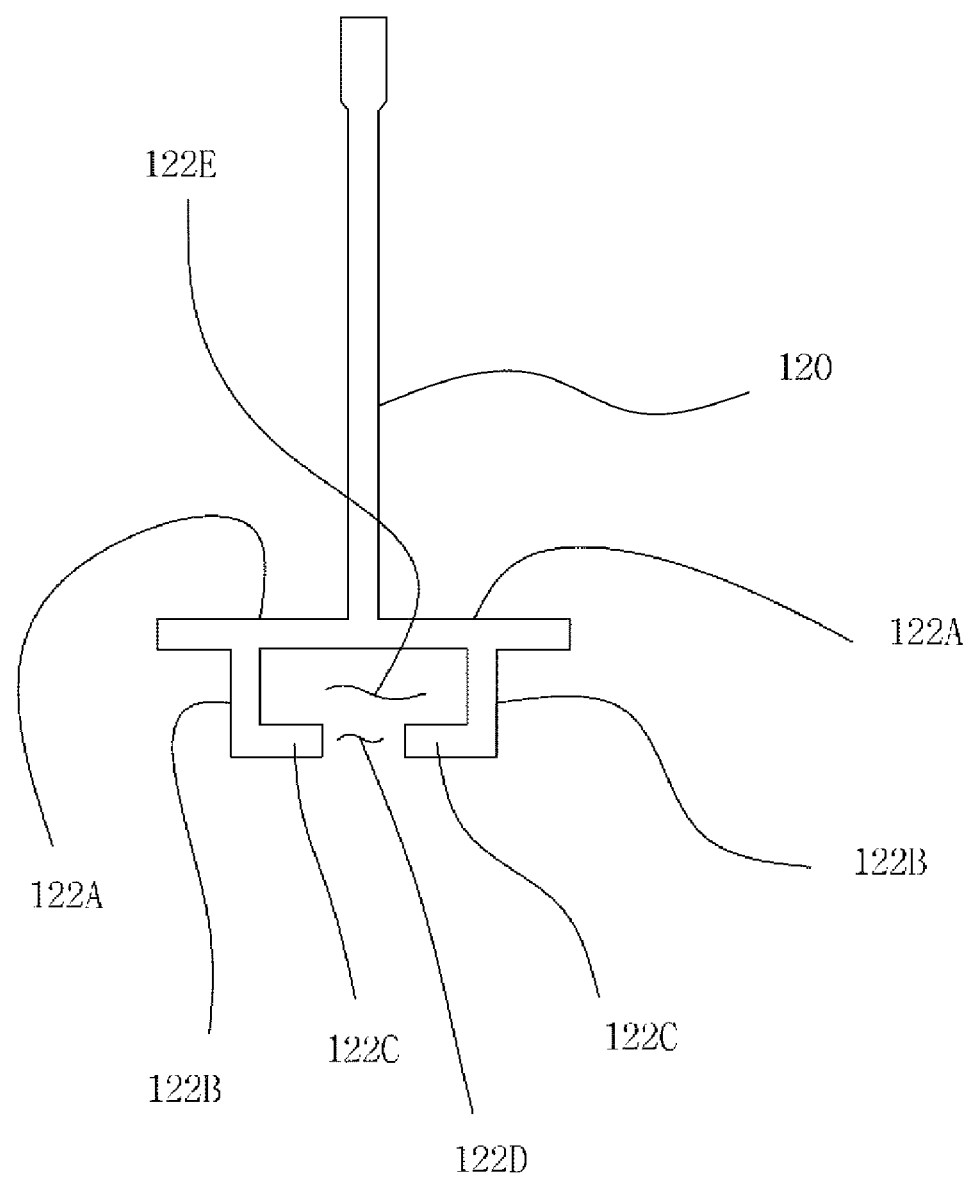
FIG. 3 is a front view of a ceiling plate support bar, which is another main part of the present invention.
Figure 4:
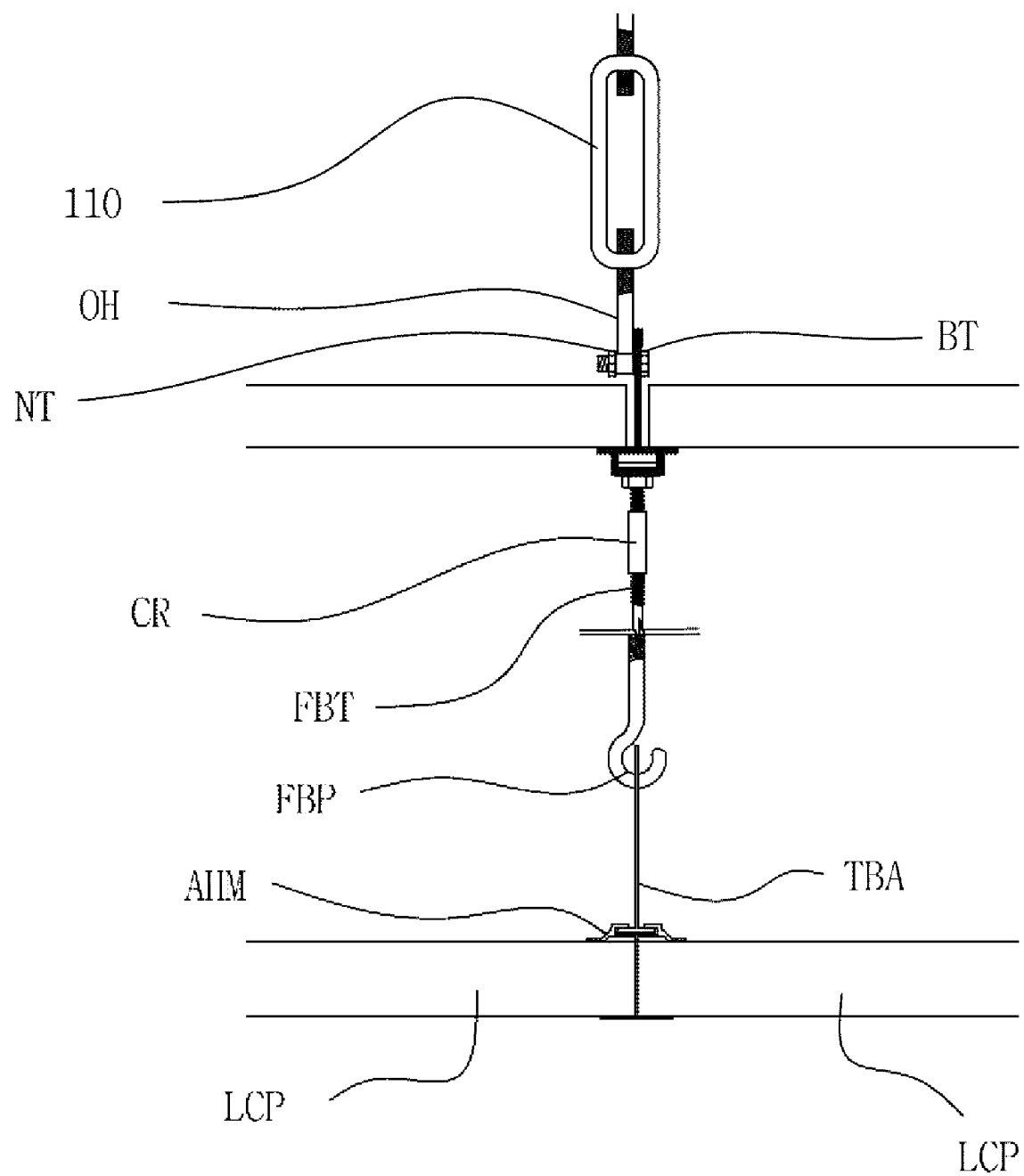
FIG. 4 is a front view schematically illustrating a state in which a ceiling plate is supported and installed by a support structure for installing a ceiling plate according to the present invention.
Figure 5:
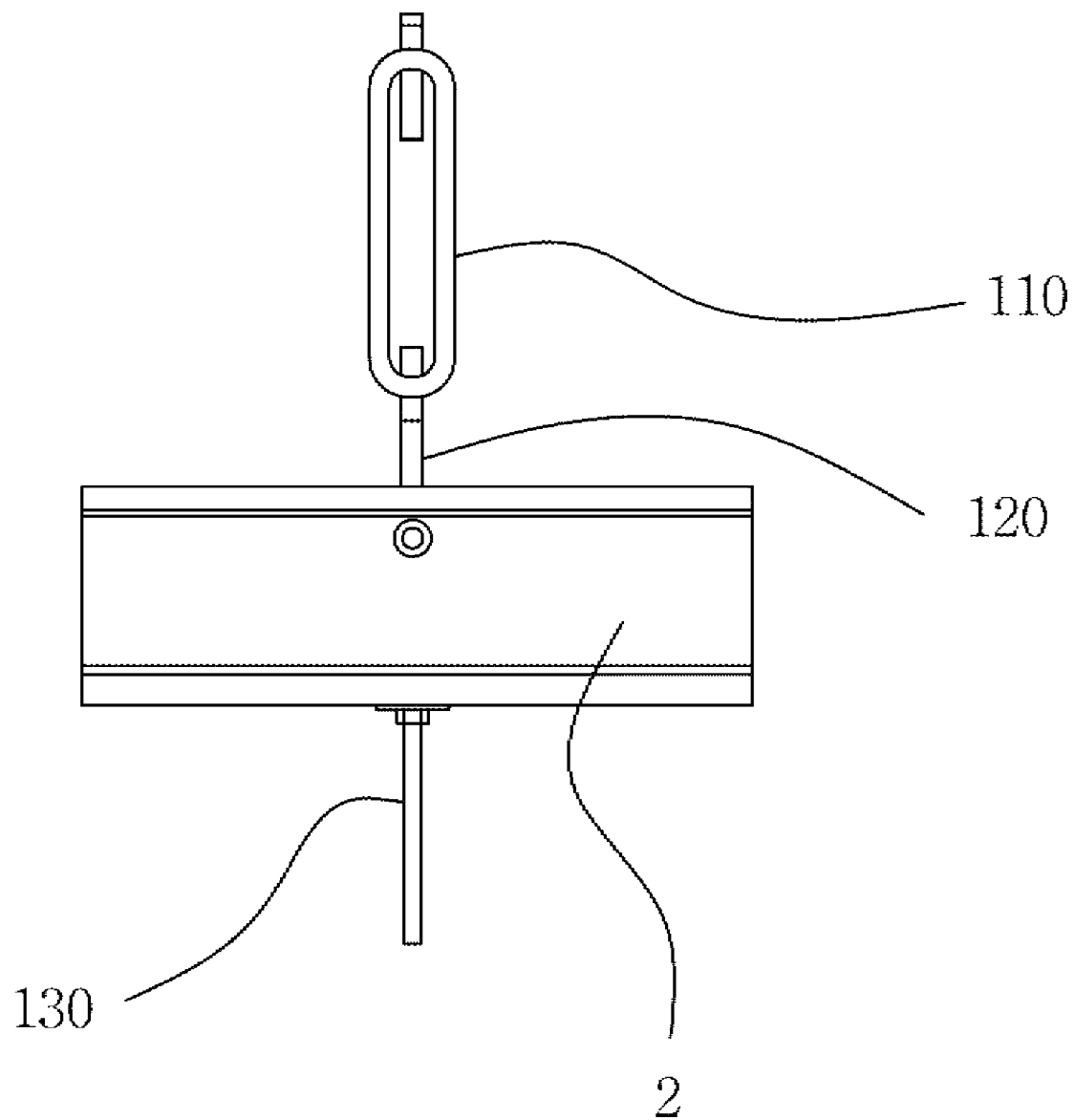
FIG. 5 is one side view of FIG. 4.

FIG. 1 is one side view of a hammer bolt which is a main part of a support structure for installing a ceiling plate according to the present invention, FIG. 2 is a plan view illustrating a head of a hammer bolt illustrated in FIG. 1, FIG. 3 is a front view of a ceiling plate support bar, which is another main part of the present invention, FIG. 4 is a front view schematically illustrating a state in which a ceiling plate is supported and installed by a support structure for installing a ceiling plate according to the present invention, and FIG. 5 is one side view of FIG. 4.

Referring to drawings, a support structure for installing a ceiling plate according to the present invention includes: an O-shaped hanging member 110 that is fixed under a ceiling slab; a ceiling plate support bar 120 that is provided with a pair of mounting parts on both sides of a center and a channel 122 provided at a lower portion; and a hammer bolt 130 that is fastened to the ceiling plate support bar 120.

The channel 122 for coupling the hammer bolt 130 includes a pair of horizontal mounting pieces 122A that are provided on both sides of the lower portion of the ceiling plate support bar 120, a pair of left and right upright channel pieces 122B whose upper end portions are connected to the pair of horizontal mounting pieces 122A, and a pair of bolt coupling support pieces 122C that is connected to the pair of upright channel pieces 122B and extends horizontally in a direction approaching each other, a bolt coupling slit 122D is secured between inner ends of the pair of bolt coupling support pieces 122C facing each other, and a bolt head coupling space 122E is secured between the pair of bolt coupling support piece 122C and the pair of left and right upright channel pieces 122B.

The head 132 of the hammer bolt 130 includes a first horizontal surface portion 132A and a second horizontal surface portion 132B facing each other, and a first cross-surface portion 132C and a second cross-surface portion 132D that extend in a direction intersecting the first and second horizontal portions 132A and 132B, but are inclined at a certain angle with respect to the first and second horizontal portions 132A and 132B.

One end portion of the first cross-surface portion 132C is configured to be connected to one end portion of the first cross-surface portion 132A while being inclined at an obtuse angle range from the first cross-surface portion 132A, the other end portion of the first cross-surface portion 132C is configured to be connected to one end portion of the second cross-surface portion 132D, one end portion of the second cross-surface portion 132D is configured to be connected to the other end portion of the first cross-surface portion 132A while being inclined in an obtuse angle range from the second cross-surface portion 132B, and the other end portion of the second cross-surface portion 132D is configured to be connected to the other end portion of the second cross-surface portion 132B.

That is, the head 132 has a quadrangular block shape in which the first cross-surface portion 132C and the second cross-surface portion 132D are inclined to one side.

When the hammer bolt 130 rotates at a certain angle (for example, 90°) in one direction (for example, clockwise) while the hammer bolt 130 is inserted between the bolt coupling slit 122D between the pair of bolt support pieces of the ceiling plate support bar 120 and the head 132 is inserted into the bolt head coupling space 122E of the ceiling plate support bar 120, the hammer bolt 130 no longer rotates and is fixed while the first cross-surface portion 132C and second cross-surface portion 132D are pressurized and adhered to inner surfaces of the pair of left and right upright channel pieces 122B of the ceiling plate support bar (120) facing each other, so it is possible to firmly couple the hammer bolt 130 to the ceiling plate support bar 120, and only the hammer bolt 130 is turned based on the channel 122 of the ceiling plate support bar 120, so it is possible to easily and quickly couple the hammer bolt 130 to the ceiling plate support bar 120.

In this case, since a curved portion is provided at a portion where the first cross-surface portion 132C and the first horizontal portion 132A are connected and a curved portion is also provided at a portion where the second cross-surface portion 132C and the second horizontal portion 132B are connected, when the hammer bolt 130 is turned, the curved portions are in first contact with an inner surface of the upright channel piece 122B of the ceiling plate support bar 120 and the curved portions smoothly slip on the inner surfaces of the pair of upright channel pieces 122B, so it is possible to be more easily and smoothly coupled to the channel 122 of the ceiling support member by turning the hammer bolt 130.

According to the present invention, a support bar fastening structure for constructing a ceiling panel may give support bars with a standardized appearance at a portion where support bars crosses vertically and horizontally, and allow the support bars to intersect vertically and horizontally without breaking to improve a process of cutting the support bars, so it is possible to increase process efficiency and easily and conveniently mount a ceiling plate 2 in a rectangular space formed by the support bars that pass through cut grooves vertically and horizontally.

In addition, according to the present invention, it is possible to securely provide the support structure for the ceiling plate 2 that can be installed stably by mounting a plurality of ceiling panels under a ceiling slab.

Meanwhile, the ceiling plate support bar 120 is provided with a thickness expansion portion of an upper portion so that a coupling support step is secured at the thickness expansion portion, and is configured to prevent the O-shaped ring from being separated above the ceiling plate support bar 120 by catching the head 132 of a bolt and a nut on the coupling support step while an O-shaped ring is coupled to one surface of the thickness expansion portion using the bolt and nut.

Since the coupling support step of the lower end portion of the thickness expansion portion is caught while the O-shaped ring is coupled to a turnbuckle fixed to a bottom surface of the ceiling slab and the ceiling plate support bar 120 is installed under the ceiling slab, it is possible to more reliably prevent the ceiling plate support bar 120 from being separated under the ceiling slab. Accordingly, it is possible to move reliably prevent the ceiling plate 2 from being separated downward from below the ceiling slab by mounting the ceiling plate 2 on the horizontal mounting piece 122A of the ceiling plate support bar 120. It is possible to implement a structure that further strengthens the structure for mounting the ceiling plate 2 by the thickness expansion portion and the coupling support step.

In this case, according to the present invention, the ceiling plate support bar 120 (new cross bar) is coupled to the O-shaped ring member 110 by a bolt (BT) and a nut (NT), the head 132 of the hammer bolt 130 is coupled to the channel 122 of the ceiling plate support bar 120, the hammer bolt 130 is firmly coupled to the channel 122 of the ceiling plate support bar 120 by a washer and nut, a full threaded bolt (FBT) is connected to the hammer bolt 130 by a coupling (CR), TBA is connected to a ring (FBP) of the full threaded bolt (FBT), an aluminum hanger mold (AHM) is coupled to the TBA, and a lower portion ceiling plate (LCP) is coupled to the hanger mold (AHM).

Figure 6:
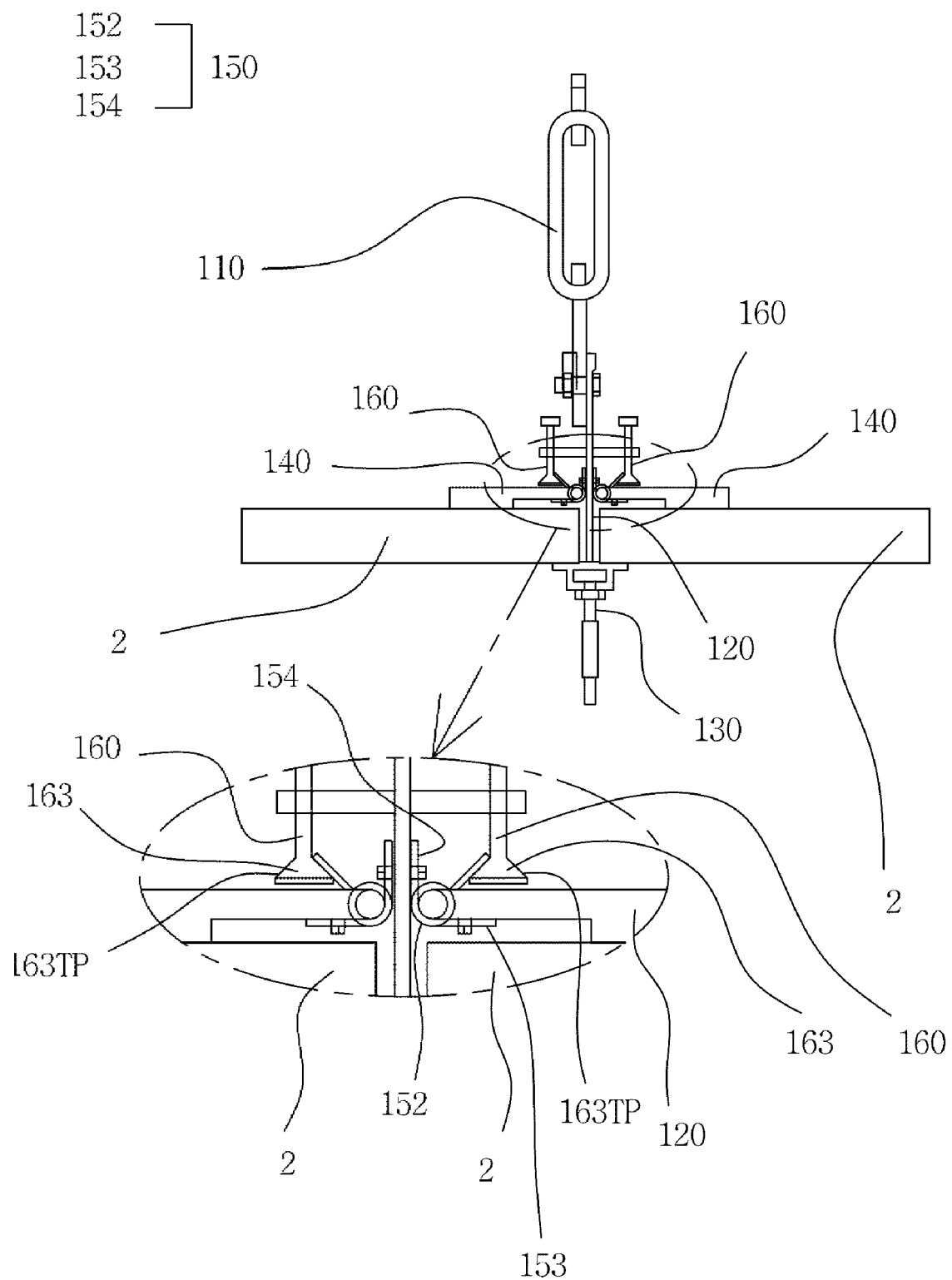
FIG. 6 is a front view schematically illustrating a state in which a ceiling plate is supported and installed by a support structure for installing a ceiling plate according to another embodiment of the present invention.
Figure 7:
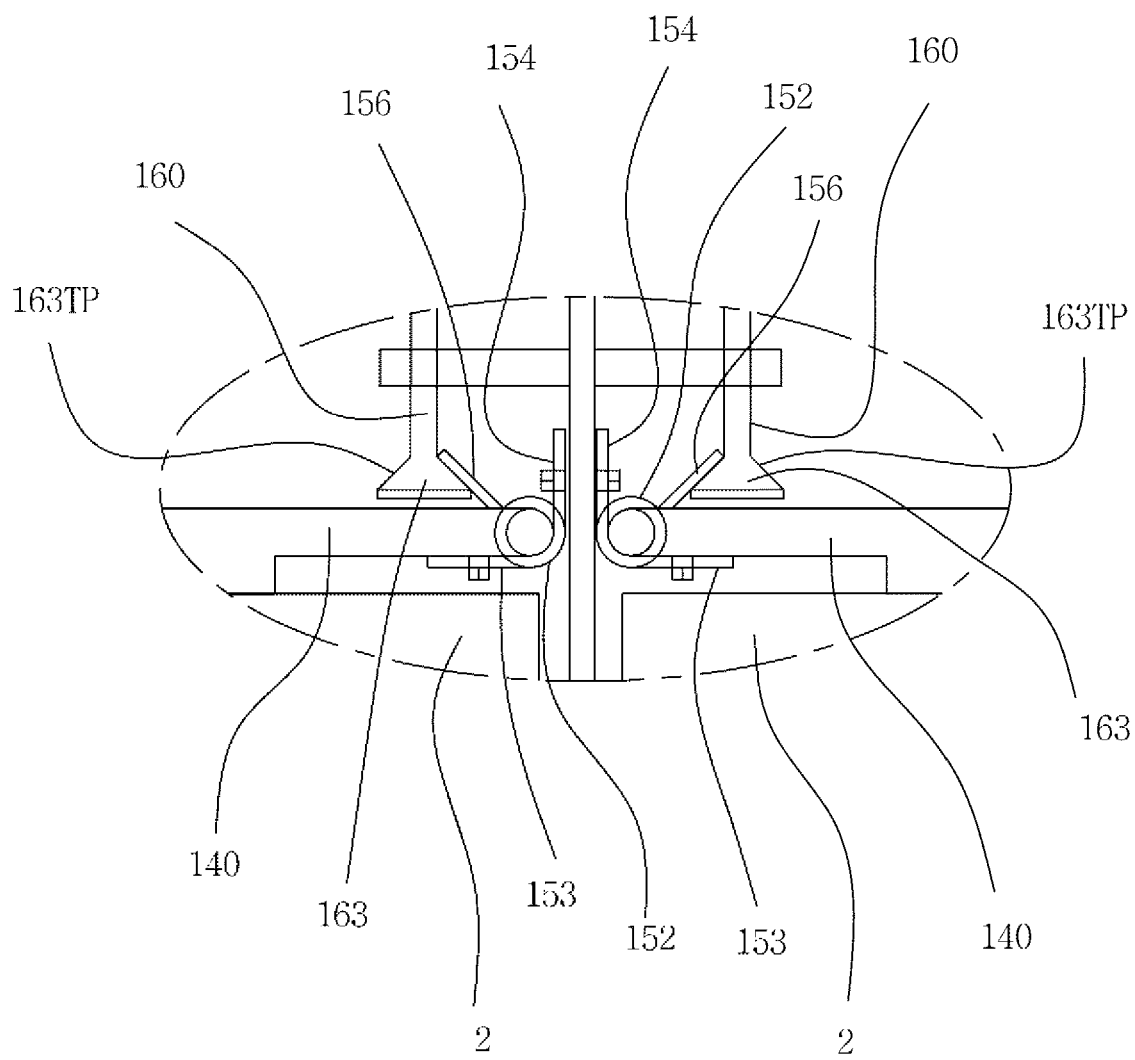
FIG. 7 is an enlarged front view of the main part illustrated in FIG. 6.
Figure 8:
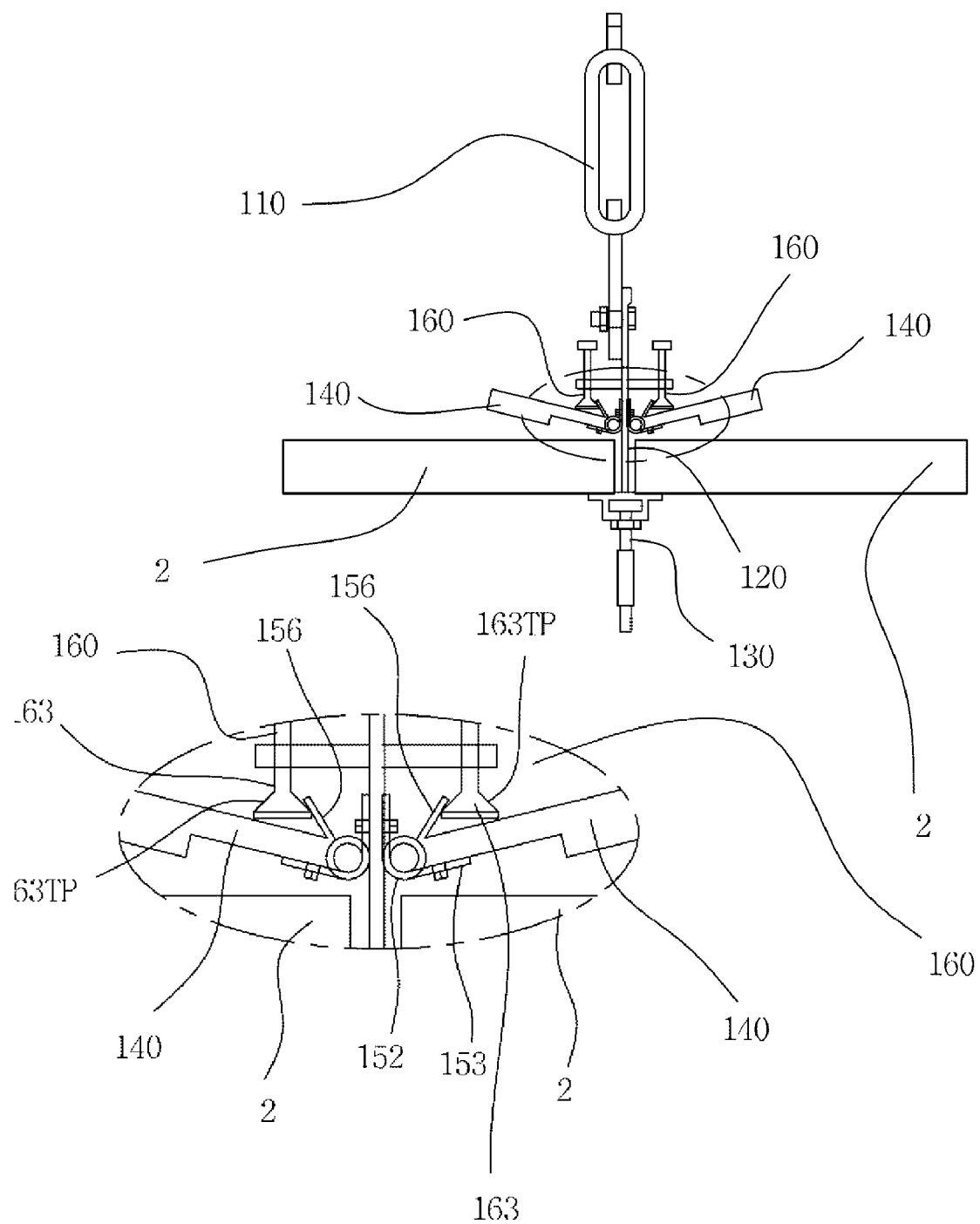
FIG. 8 is a front view illustrating a state in which a mounting grip piece, which is the main part illustrated in FIG. 6, rotates upward.
Figure 9:
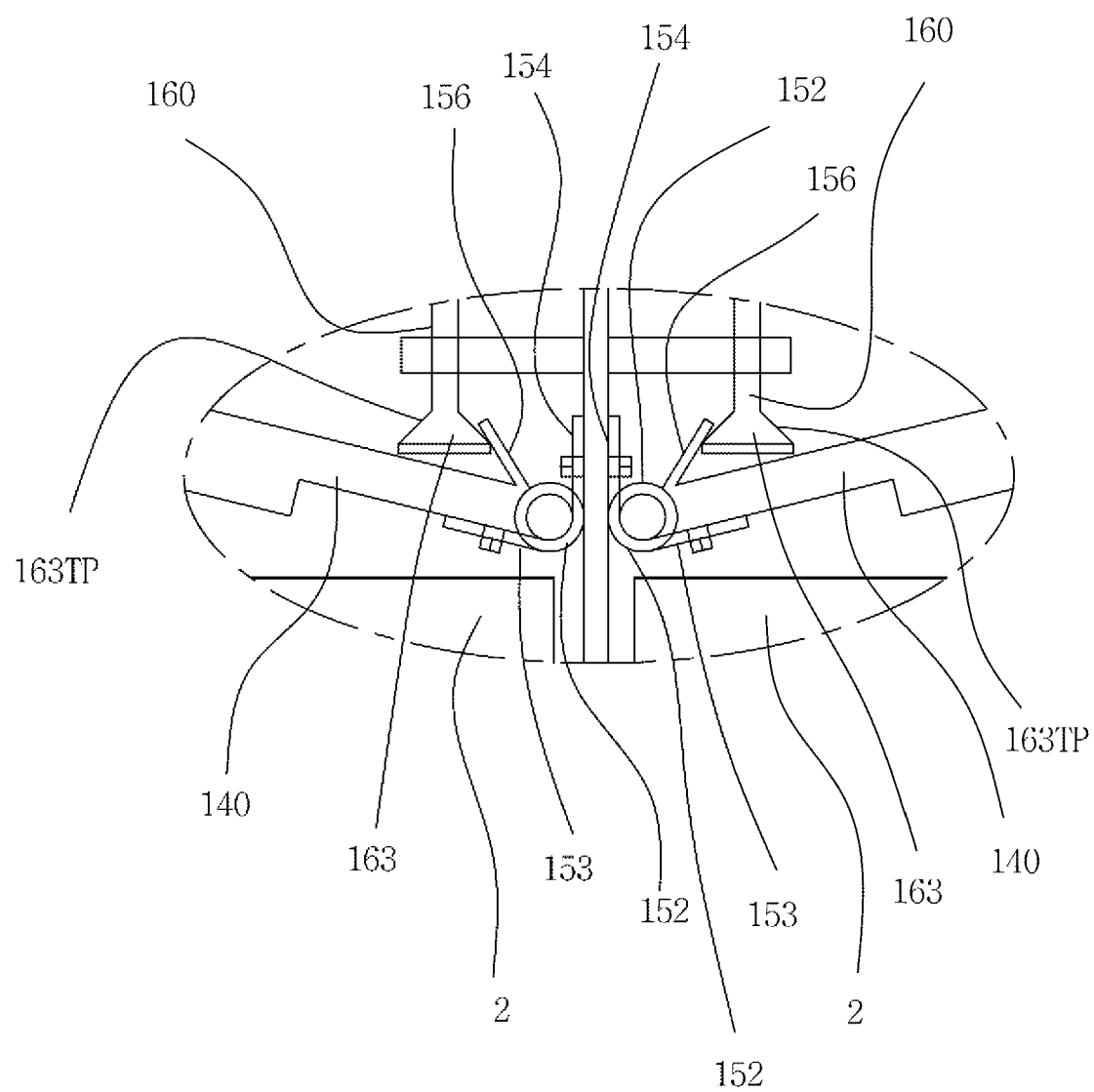
FIG. 9 is an enlarged front view of the main part of FIG. 8.
Figure 10:
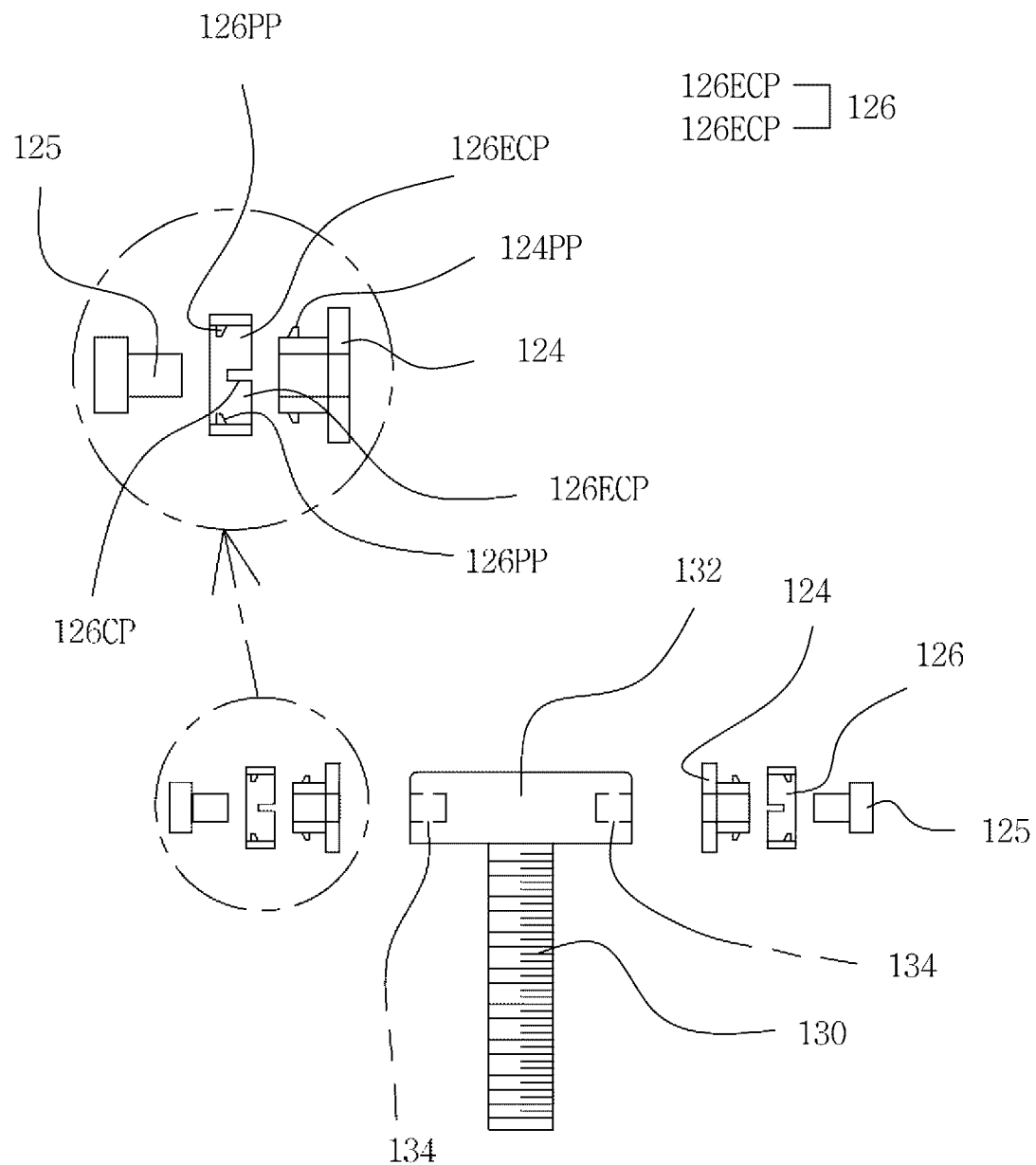
FIG. 10 is a front view illustrating an exploded state of a main part of a support structure for installing a ceiling plate according to another embodiment of the present invention.
Figure 11:
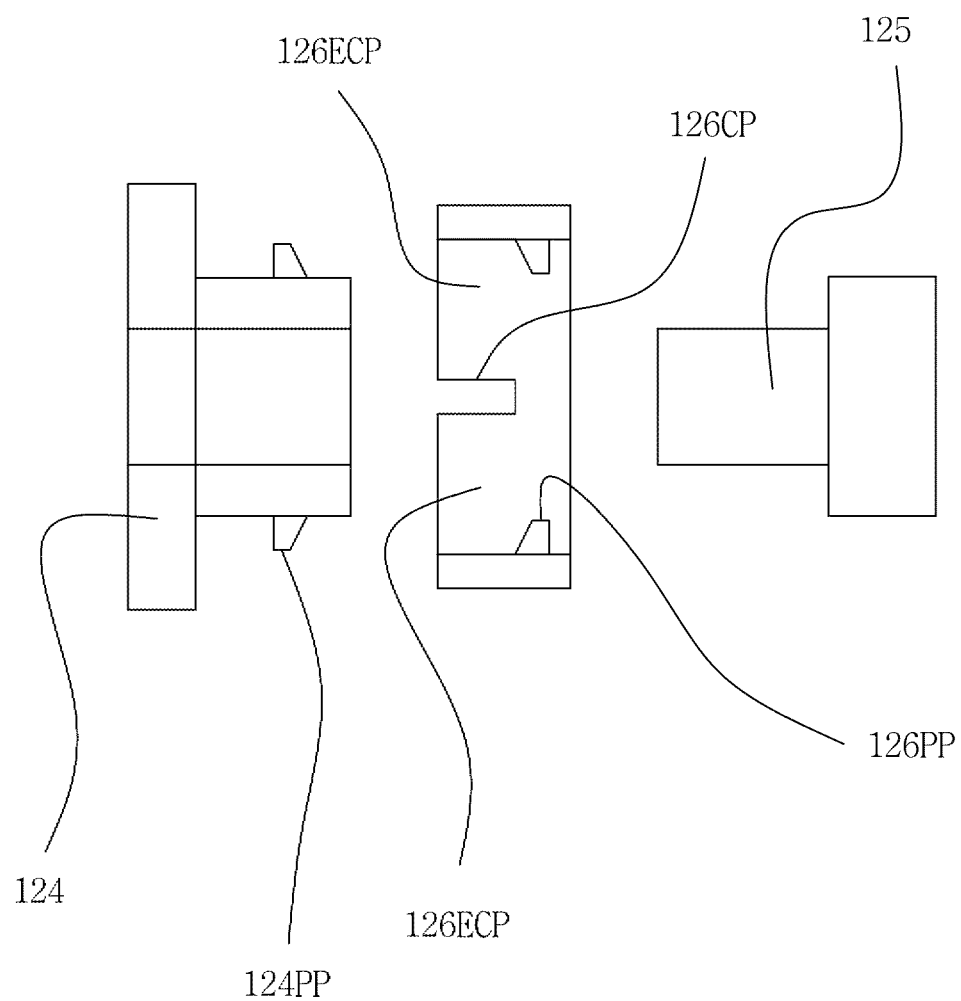
FIG. 11 is a front view illustrating a partially enlarged main part illustrated in FIG. 10.
Figure 12:
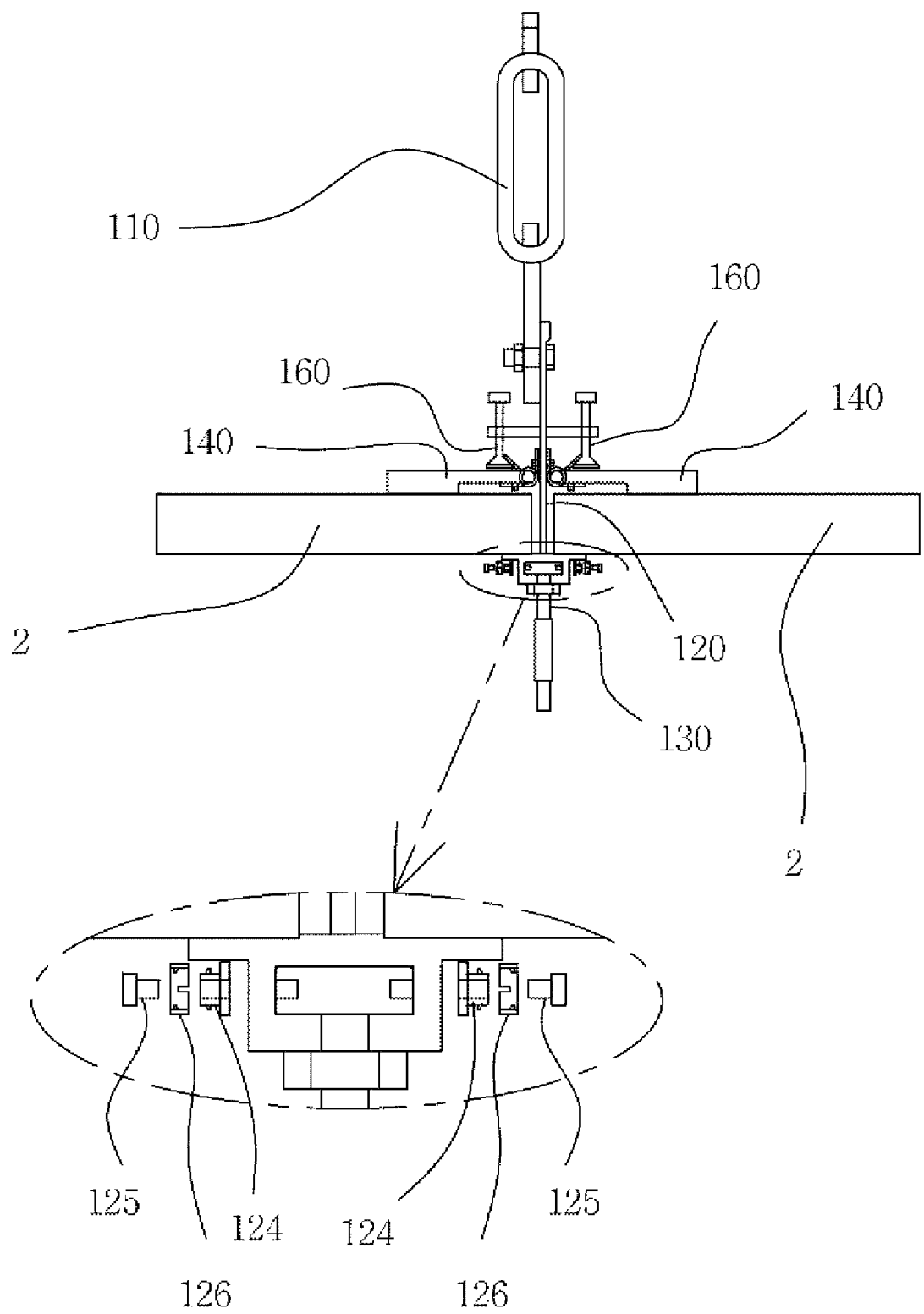
FIG. 12 is a front view illustrating a state in which the ceiling plate is mounted by the support structure for installing a ceiling plate according to another embodiment of the present invention, and a state before main parts are coupled.
Figure 13:
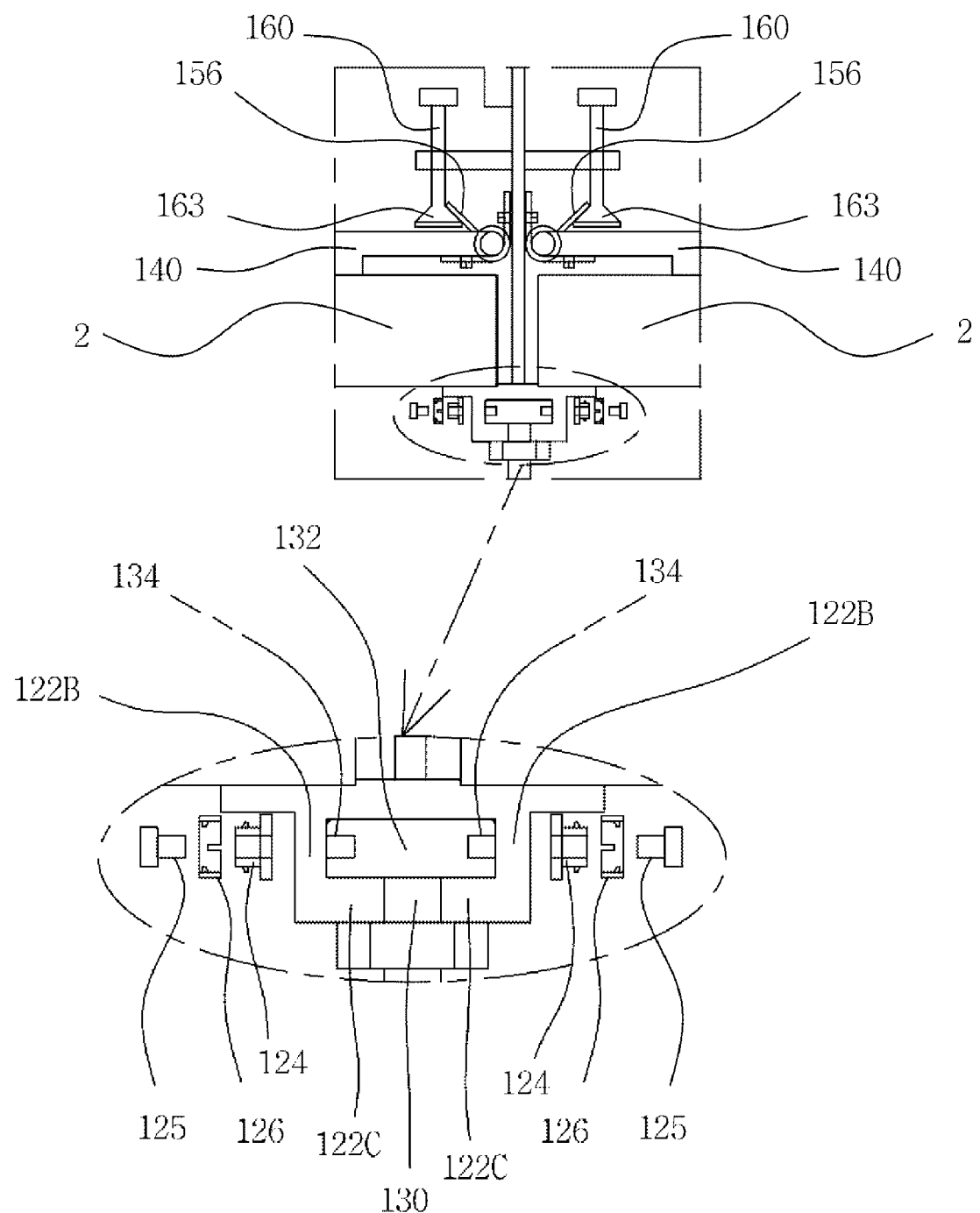
FIG. 13 is an enlarged front view of the main part illustrated in FIG. 12.
Figure 14:
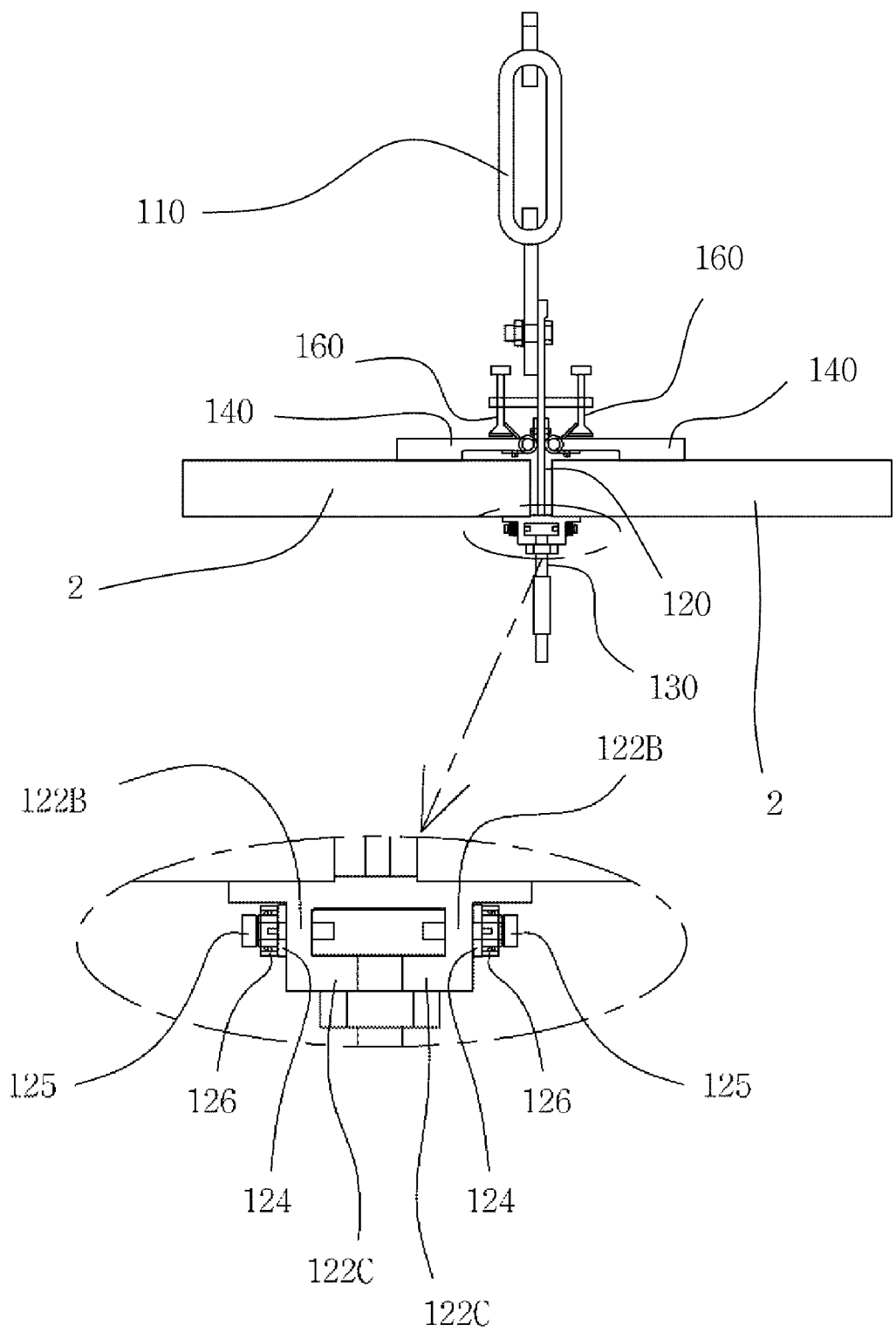
FIG. 14 is a front view illustrating a state in which the ceiling plate is installed by coupling the main parts illustrated in FIG. 12.
Figure 15:
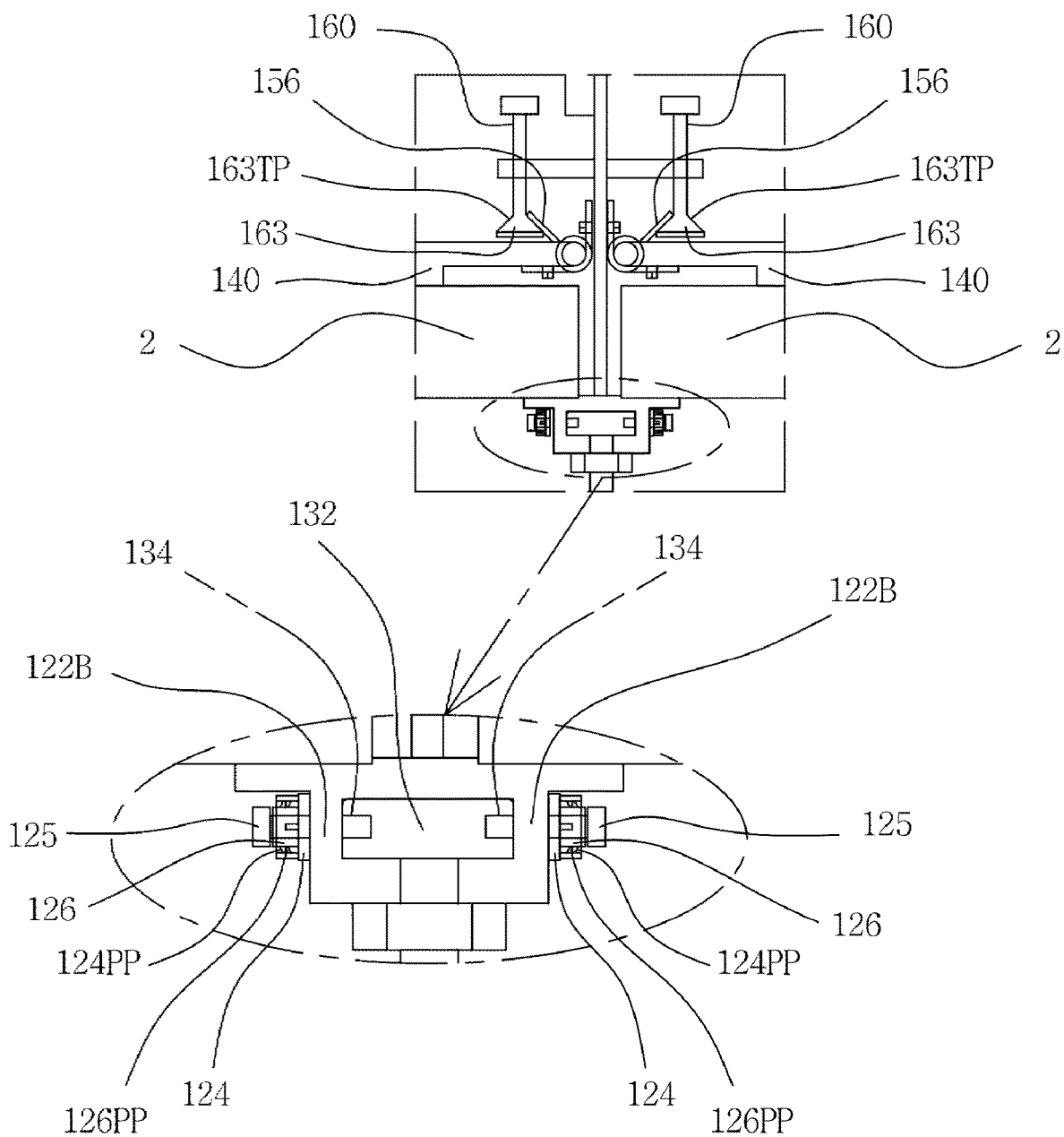
FIG. 15 is an enlarged front view of the main part illustrated in FIG. 14.

FIG. 6 is a front view schematically illustrating a state in which a ceiling plate is supported and installed by a support structure for installing a ceiling plate according to another embodiment of the present invention, FIG. 7 is an enlarged front view of the main part illustrated in FIG. 6, FIG. 8 is a front view illustrating a state in which a mounting grip piece, which is the main part illustrated in FIG. 6, rotates upward, FIG. 9 is an enlarged front view of the main part of FIG. 8, FIG. 10 is a front view illustrating an exploded state of a main part of a support structure for installing a ceiling plate according to another embodiment of the present invention, FIG. 11 is a front view illustrating a partially enlarged main part illustrated in FIG. 10, FIG. 12 is a front view illustrating a state in which the ceiling plate is mounted by the support structure for installing a ceiling plate according to another embodiment of the present invention, and a state before main parts are coupled, FIG. 13 is an enlarged front view of the main part illustrated in FIG. 12, FIG. 14 is a front view illustrating a state in which the ceiling plate is installed by coupling the main parts illustrated in FIG. 12, and FIG. 15 is an enlarged front view of the main part illustrated in FIG. 14.

According to another embodiment of the present invention, a mounting grip piece 140 and a rotation guide bar 160 are further provided. The embodiment of the present invention described above is an embodiment in which the mounting grip piece 140 and the rotation guide bar 160 are not provided, and another embodiment of the present invention described below is an embodiment in which the mounting grip piece 140 and the rotation guide bar 160 are provided. FIGS. 6 to 9 illustrate another embodiment of the present invention in which the mounting grip piece 140 and the rotation guide bar 160 are further provided.

Meanwhile, the ceiling plate support bar 120 further includes the mounting grip piece 140 that is disposed above the channel 122 and coupled via a hinge, and a grip actuating elastic body 150 that supports the mounting grip piece 140 to rotate downward toward a horizontal mounting piece 122A of the channel 222, The hinge coupling the mounting grip piece 140 to the ceiling plate support bar 120 includes a hinge boss that is provided on the ceiling plate support bar 120 and a hinge pin that is coupled to the mounting grip piece 140 and rotatably coupled to the hinge boss, the grip actuating elastic body 150 is composed of a torsion spring in which a first elastic wire part 153 and a second elastic wire part 154 are connected to a circular elastic coil part 152, the circular coil elastic part is coupled to an outer circumferential surface of the hinge pin, and the first elastic wire part 153 and the second elastic wire part 154 are connected to the ceiling plate support bar 120 and the mounting grip piece 140, respectively, The mounting grip piece 140, the hinge, and the grip actuating elastic body 150 are provided on both sides of the ceiling plate support bar 120.

The mounting grip piece 140 is configured to elastically rotate downward by elastic force of the grip actuating elastic body 150 while the ceiling plate 2 is mounted on the horizontal mounting piece 122A of the channel 122 to elastically grip the bottom and top surfaces of the ceiling plate 2, so it is possible to maintain the ceiling plate 2 while the ceiling plate 2 is more stably mounted on the ceiling plate support bar 120 without moving. Furthermore, the ceiling plate 2 is maintained while being mounted on the ceiling plate support bar 120 without moving, so it is possible to more smoothly and easily perform building ceiling operation such as installing lighting on the ceiling plate 2.

Meanwhile, an upwardly inclined protrusion 156 is provided at a proximal end of the mounting grip piece 140, the rotation guide bar 160 is coupled to the ceiling plate support bar 120 in a screw manner so that the rotation guide bar 160 may rotate and move up and down, an extended body 163 is provided at the lower end portion of the rotation guide bar 160, and a downwardly inclined guide taper part 163TP is provided at an upper end portion of the extended body 163.

The rotation guide bar 160 is formed in a circular bar shape, and a bar-side threaded part is provided on an outer circumferential surface of the rotation guide bar 160. The bar-side threaded part is disposed above a guide taper part 163TP.

The circular boss is provided on the ceiling plate support bar 120, and the threaded part is provided on an outer circumferential surface of the circular boss.

The guide taper part in contact with a bottom surface of the upwardly inclined protrusion 156 of the mounting grip piece 140 while the rotation guide bar 160 descends relative to the circular boss of the ceiling plate support bar 120.

When the rotation guide bar 160 rotates clockwise while the guide taper part 163TP provided on the extended body 163 of the rotation guide bar 160 is in contact with the bottom surface of the upwardly inclined protrusion 156 of the mounting grip piece 140, the rotation guide bar 160 and the extended body 163 rise simultaneously, the upwardly inclined protrusion 156 of the mounting grip piece 140 rotates upward by the extended body 163 of the rotation guide bar 160, and the mounting grip piece 140 to which the upwardly inclined protrusion 156 is connected rotates upward based on the hinge coupled to the ceiling plate support bar 120, while since the first elastic wire part 153 and the second elastic wire part 154 of the grip actuating elastic body 150 are unfolded and have elastic restoring force, there is no case where the ceiling plate 2 is not caught in the mounting grip piece 140 while the ceiling plate 2 is mounted on the horizontal mounting piece 122A that forms the channel 122 of the ceiling plate support bar 120, so it is possible to easily and smoothly mount the ceiling plate 2 on the ceiling plate support bar 120.

Meanwhile, when the rotation guide bar 160 rotates counterclockwise while the rotation guide bar 160 descends and the mounting grip piece 140 rotates upward, the upwardly inclined protrusion 156 of the mounting grip piece 140 and the mounting grip piece 140 descend based on the hinge connected to the ceiling plate support bar 120 while the rotation guide bar 160 and extended body 163 descend simultaneously, and at the same time, the mounting grip piece 140 rotates downward based on the hinge connected to the ceiling plate support bar 120 while the first elastic wire portion 153 and the second elastic wire portion 154 of the grip actuating elastic body 150 become narrow again by the elastic restoring force while being spread apart, so the ceiling plate 2 may be switched to the state where the ceiling plate 2 is gripped and supported by the horizontal mounting piece 122A and the mounting grip piece 140 of the channel 122 of the ceiling plate support bar 120.

Meanwhile, the reinforced coupling groove 134 is provided in the first cross-surface portion 132C and the second cross-surface portion 132D of the head 132 of the hammer bolt 130, the bolt coupling boss 124 is provided on the outer surfaces of the pair of upright channel pieces 122B of the channel 122 of the ceiling plate support bar 120, the fixed support bolt 125 is coupled to the bolt coupling boss 124, the tip of the fixed support bolt 125 is inserted into the reinforced coupling grooves 134 formed in the first cross-surface portion 132C and the second cross-surface portion 132D of the head 132 of the hammer bolt 130, the first cross-surface portion 132C of the head 132 and the second cross-surface portion 132D slip while being pressed against the inner surface of the pair of upright channel pieces 122B of the channel 122 of the ceiling plate support bar 120 to reversely rotate the head 132 of the hammer bolt 130 to prevent the head 132 of the hammer bolt 130 from being separated from the channel 122 of the ceiling plate support bar 120, so it is possible to more reliably preventing the hammer bolt 130 from being separated from the ceiling plate support bar 120. Furthermore, by preventing the hammer bolt 130 from being separated from the channel 122 of the ceiling plate support bar 120, it is possible to more reliably prevent the ceiling plate 2 on which the ceiling plate 2 is mounted from being separated. By more reliably preventing the ceiling plate 2 from being separated, it is possible to further increase the reliability in construction of the ceiling plate 2.

Meanwhile, the present invention further includes a cap coupling protrusion 124PP provided on the outer peripheral surface of the bolt coupling boss 124, a coupling reinforcement cap 126 coupled to the outer peripheral surface of the bolt coupling boss 124, a coupling reinforcement locking piece 126PP provided on the inner peripheral surface of the coupling reinforcement cap 126, and a plurality of coupling reinforcement cap pieces 126ECP arranged in a radial direction with respect to the center of the coupling reinforcement cap 126 by a plurality of cutouts 126CP penetrating through the inner and outer peripheral surfaces and the tip of the coupling reinforcement cap 126.

The fixed support bolt 125 is inserted into the reinforced coupling groove 134 formed in the head 132 of the hammer bolt 130, when the coupling reinforcement cap 126 is pushed in from the end of the bolt coupling boss 124 while a front end portion of a coupling reinforcement locking piece 126PP on inner peripheral surface of the plurality of cap coupling protrusions 124PP is in contact with a front end portion of the cap coupling protrusion 124PP on an outer peripheral surface of the bolt coupling boss 124, and the plurality of coupling reinforcement cap pieces 126ECP of the coupling reinforcement cap 126 are in a spread state due to a cutout 126CP while the coupling reinforcement locking piece 126PP on the inner peripheral surface of the plurality of cap coupling protrusions 124PP goes beyond the cap coupling protrusion 124PP of the bolt coupling boss 124, and in this state, when the coupling reinforcement cap 126 is continuously pushed and the coupling reinforcement locking piece 126PP completely goes beyond the cap coupling protrusion 124PP, since a rear end portion of the coupling reinforcement locking piece 126PP is caught in a rear end portion of the cap coupling protrusion 124PP, the coupling reinforcement cap 126 is maintained coupled to the channel 122 of the ceiling plate support bar 120 and the coupling reinforcement cap 126 is supported by contacting the end of the fixed support bolt 125, so it is possible to prevent the fixed support bolt 125 from being easily loosened by the action of external forces such as vibration. Furthermore, the fixed support bolt 125 that fixes the hammer bolt 130 to the channel 122 of the ceiling plate support bar 120 is prevented from being easily loosened by external forces such as vibration to prevent the hammer bolt 130 from rotating and flowing in the channel 122 of the ceiling plate support bar 120, thereby more firmly supporting the ceiling structure coupled to the hammer bolt 130.

Hereinabove, specific embodiments of the present invention have been described. However, the spirit and scope of the present invention is not limited to these specific embodiments, and it will be understood by those of ordinary skill in the art that various modifications and variations are possible within the scope of not changing the gist of the present invention.

Therefore, since the embodiments described above are provided to completely inform the scope of the present invention to those with ordinary skill in the technical field to which the present invention pertains, it should be understood that the embodiments are exemplary and not limited in all respects, and the present invention is only defined by the scope of the claims.

The invention claimed is:

1. A support structure for installing a ceiling plate, comprising:
   a hanging member (110) that is fixed under a slab of a ceiling;
   a ceiling plate support bar (120) that is provided with a pair of mounting parts on both sides of a center and a channel (122) provided at a lower portion; and
   a hammer bolt (130) fastened to the ceiling plate support bar (120),
   wherein the channel (122) for coupling the hammer bolt (130) includes a pair of horizontal mounting pieces (122A) that are provided on both sides of the lower portion of the ceiling plate support bar (120), a pair of left and right upright channel pieces (122B) whose upper end portions are connected to the pair of horizontal mounting pieces (122A), and a pair of bolt coupling support pieces (122C) that is connected to the pair of upright channel pieces (122B) and extends horizontally in a direction approaching each other, a bolt coupling slit (122D) is secured between inner ends of the pair of bolt coupling support pieces (122C) facing each other, and a bolt head coupling space (122E) is secured between the pair of bolt coupling support piece (122C) and the pair of left and right upright channel pieces (122B),
   the ceiling plate support bar (120) further includes a mounting grip piece (140) that is disposed above the channel (122) and coupled via a hinge, and a grip actuating elastic body (150) that supports the mounting grip piece (140) to rotate downward toward the horizontal mounting piece (122A) of the channel (122),
   the hinge coupling the mounting grip piece (140) to the ceiling plate support bar (120) includes a hinge boss that is provided on the ceiling plate support bar (120) and a hinge pin that is coupled to the mounting grip piece (140) and rotatably coupled to the hinge boss, the grip actuating elastic body (150) is composed of a torsion spring in which a first elastic wire part (153) and a second elastic wire part (154) are connected to a circular elastic coil part (152), the circular coil elastic part is coupled to an outer circumferential surface of the hinge pin, and the first elastic wire part (153) and the second elastic wire part (154) are connected to the ceiling plate support bar (120) and the mounting grip piece (140), respectively,
   the mounting grip piece (140), the hinge, and the grip actuating elastic body (150) are provided on both sides of the ceiling plate support bar (120), and
   in a state where the ceiling plate (2) is mounted on the horizontal mounting piece (122A) of the channel (122), the mounting grip piece (140) is configured to elastically rotate downward by an elastic force of the grip actuating elastic body (150) to elastically grip bottom and top surfaces of the ceiling plate (2).

2. The support structure for installing a ceiling plate of claim 1, wherein the head (132) of the hammer bolt (130) includes a first horizontal surface portion (132A) and a second horizontal surface portion (132B) facing each other, and a first cross-surface portion (132C) and a second cross-surface portion (132D) that extend in a direction intersecting the first and second horizontal portions (132A and 132B), but are inclined at a certain angle with respect to the first and second horizontal portions (132A and 132B).

* * * * *